United States Patent [19]

Suzuki et al.

[11] Patent Number: 4,954,006
[45] Date of Patent: Sep. 4, 1990

[54] BALL JOINT

[75] Inventors: Kazumasa Suzuki; Masahiro Yamada; Keiichiro Suzuki, all of Shizuoka, Japan

[73] Assignee: Ishikawa Tekko Kabushiki Kaisha, Tokyo, Japan

[21] Appl. No.: 313,028

[22] Filed: Feb. 21, 1989

[30] Foreign Application Priority Data

Oct. 18, 1988 [JP] Japan .......................... 63-135779[U]

[51] Int. Cl.⁵ .................................................. F16D 1/12
[52] U.S. Cl. .................................... 403/135; 403/133; 403/140; 403/304
[58] Field of Search ............... 403/122, 132, 133, 134, 403/135, 140, 141, 137, 39, 71, 321, 326, 304; 29/149.5, 441.1, 512

[56] References Cited

U.S. PATENT DOCUMENTS

| | | | |
|---|---|---|---|
| 4,063,834 | 12/1977 | Hanson et al. | 403/138 |
| 4,231,673 | 11/1980 | Satoh et al. | 403/135 X |
| 4,386,949 | 6/1983 | Bassi | 403/141 X |
| 4,410,295 | 10/1983 | Ersoy et al. | 403/135 X |
| 4,693,628 | 9/1987 | Renk | 403/135 |
| 4,697,948 | 10/1987 | Fukuda | 403/71 |
| 4,750,886 | 6/1988 | Portelli et al. | 403/71 X |

Primary Examiner—Andrew V. Kundrat
Assistant Examiner—Fanco S. Deliguori
Attorney, Agent, or Firm—Nilles & Nilles

[57] ABSTRACT

A ball joint wherein a ball seat having a closed side is insertewd between an inner surface of a housing and an outer surface of a ball portion of a ball stud, the ball seat being formed of a hard synthetic resin, and having an annular flange after on the closed side of the ball seat engaged with an opened edge at one side of the housing, an annular flange engaged with an opened edge at the other side of the housing, and an annular recess provided on the inner circumferential side of the annular flange on the closed side of the ball seat and enabling the same annular flange.

9 Claims, 1 Drawing Sheet

1

BALL JOINT

BACKGROUND OF THE INVENTION

1. Field of the Invention

This invention relates to a ball joint consisting of a housing having a cylindrical bore, a ball seat composed of a hard synthetic resin and fitted fixedly in the cylindrical bore, and a ball stud having a ball portion fitted fixedly in the ball seat.

2. Description of the Prior Art

In a conventional ball joint of this kind, a soft polyurethane resin is used to make a ball seat so that the ball seat can be inserted easily into a housing, as shown in Japanese Utility Model Publication No. 22205/1975.

The data which are obtained when a load is imparted to this conventional ball joint in the axial direction of the ball stud are as follows. A ball stud separating load is about 70 kg in the case where the diameter of the ball portion is 20 mm, and a seat extruding load which causes the ball seat to be separated from a socket in a direction opposite to the direction in which the ball stud is separated is about 230 kg.

Regarding a ball joint of this kind, it has been demanded that the strength thereof with respect to these loads be improved, and that the dimensions and weight thereof be reduced. In order to meet this demand, it is necessary that the material for the ball seat be changed from a soft polyurethene resin to a hard synthetic resin (a thermoplastic resin).

In this kind of ball joint, inserting and fixing a ball seat in a housing poses some problems. Namely, the elasticity of, for example, a hard thermoplastic resin of a ball seat to be inserted into a socket is formed is generally not higher than 1/10 of that of a soft polyurethane, so that such a ball seat is not deformed easily. Therefore, when a ball seat of conventional construction which is formed merely out of a hard thermoplastic resin is inserted into a socket, an annular flange provided at the closed side of the ball seat is broken, and the assembling of the ball joint becomes impossible.

SUMMARY OF THE INVENTION

An object of the present invention is to devise the shape of a ball seat which enables a hard synthetic resin to be used suitably therefor, with a view to solving these problems, and obtain a ball joint having an improved strength with respect to a load to be imparted thereto.

In the ball joint according to the present invention, a ball seat is fitted fixedly in a cylindrical bore in a housing, and a ball portion of a ball stud in the ball seat. This ball seat is formed out of a hard synthetic resin, and has an annular flange engaged with an opened edge at one side of the housing and formed at the ball stud inserting side of the ball seat, an annular flange having a radially outward enlarged portion engaged with an opened edge at the other side of the housing and formed at a closed side, which is rigid and immovable, of the ball seat, and an annular recess provided on the inner circumferential side of the annular flange on the closed side of the ball seat and enabling the same annular flange to be deformed elastically to the level equal to the inner diameter of the housing.

Since the present invention provides the annular recess provided at the inner circumferential side of the annular flange formed at the closed side of the ball seat, the ball seat is inserted without difficulty from the closed side thereof into the housing with this annular flange contracted elastically to the level equal to the inner diameter of the housing with the narrowing of the annular recess in spite of the hard plastic resin of which the ball seat is made.

The above and other objects as well as advantageous features of the invention will become apparent from the following description of the preferred embodiment taken in conjunction with the accompanying drawings.

DESCRIPTION OF THE PREFERRED EMBODIMENT

Figure 1:
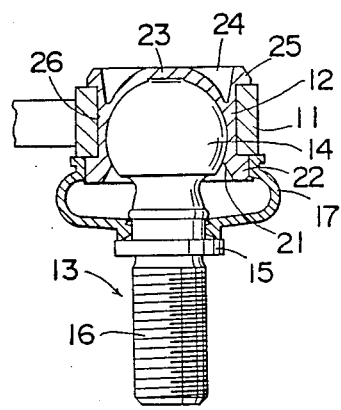
FIG. 1 is a sectional view of an embodiment of the ball joint according to the present invention.

As shown in FIG. 1, a ball seat 12 is fitted fixedly in a cylindrical bore in a housing 11, and a ball portion 14 of a ball stud 13 in this ball seat 12. In the ball stud 13, a threaded shaft portion 16 is formed continuously thereon to a flange portion 15. A dust cover 17 is fitted around the portion between the housing 11 and the flange portion 15 of the ball stud 13.

The ball seat 12 is provided at its ball stud inserting side with a lower annular flange 22 having an opening 21 for an operation, and this annular flange 22 on the ball stud inserting side of the ball seat 12 is engaged with a lower opened edge of the housing 11. The ball seat 12 is provided at the other side thereof with an immovable, rigid closed portion 23, and an annular recess 24 is formed so as to surround this closed portion 23. An upper annular flange 25 having a radially outward enlarged portion is formed on the outer circumferential side of this annular recess 24. This annular flange 25 on the closed side of the ball seat 12 is engaged with an upper opened edge of the housing 11. This annular recess 24 enables the annular flange 25 on the closed side of the ball seat 12 to be contracted elastically to the level equal to the inner diameter of the housing. A cylindrical wall portion 26 is formed between the two annular flanges 22, 25.

This ball seat 12 is molded out of a hard thermoplastic resin, for example, a hard polyacetal resin, a hard polyamide resin or a hard polyester resin.

Figure 3:
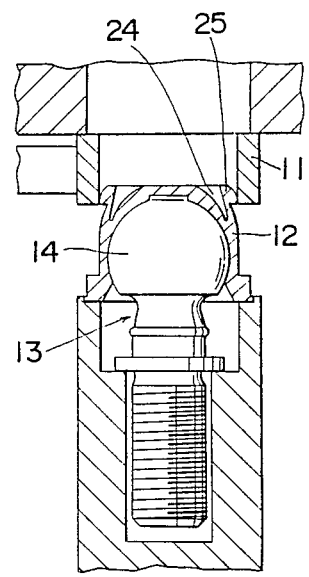
FIG. 3 is a sectional view of the ball joint being assembled.

In order to then complete the assembly shown in FIG. 1, the ball stud 13 is inserted into the ball seat 12 and the resultant combination is inserted into the housing 11, as shown in FIG. 3. During this inserting operation, the annular recess 24 in the ball seat 12 enables the annular flange 25 to be deformed easily so that the diameter of the same flange 25 decreases. The annular flange 25, the diameter of which has decreased during this inserting operation, is restored to its original shape owing to the elasticity of the material thereof after the combination has been inserted into the housing, so that the assembly shown in FIG. 1 is completed.

In the ball joint of this construction, the diameter of the ball portion 14 of the ball stud 13 is 20 mm. In the case where the ball seat is formed out of a hard polyacetal resin, a ball stud separating load is about 260 kg, and a ball seat extruding load about 600 kg. Namely, a ball joint the strength of which is about three times that of a conventional ball joint is obtained.

In order to obtain such a benefit reliably, the ball seat 12 is provided with the following means.

Figure 2:
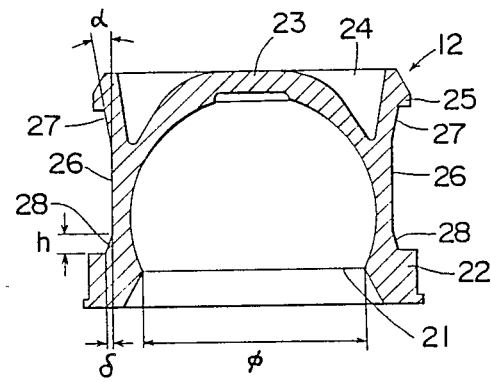
FIG. 2 is an enlarged section of a ball seat in the embodiment.

In order that the ball seat 12 be fitted in the housing 11 satisfactorily, the cylindrical wall surface portion 26 of the ball seat 12 is provided at its upper section end with a tapering part 27 inclined outward at an angle α as shown in FIG. 2, from that section of the cylindrical wall portion 26 which is in the vicinity of the bottom portion of the annular recess 24. Owing to this tapering portion 27, the cylindrical wall portion 26 of the ball seat 12 can be fitted in the inner circumferential wall of the housing 11 with no clearance left therebetween. The angle α referred to above is preferably about 5°–20°. In the case of a ball joint having a ball seat molded out of a polyacetal resin, the angle of tapering is set to about 7°.

In order to reliably obtain a good effect with respect to the separating load of the ball stud 13, a conical portion 28 is provided at the lower end of the cylindrical outer wall surface adjacent the upper section of the lower annular flange 22. This conical portion 28 is tapered with, for example, h=0.5–3 mm and δ=0.1–0.3 mm. Owing to the conical portion 28, the diameter φ of the opened portion 21 of the ball seat 12 decreases when the ball seat 12 is fitted fixedly in the housing 11, to enable the effect of preventing the separation of the ball stud 13 to be obtained reliably. The diameter φ of the opened portion 21 is restricted by the molding conditions. In the case of a ball seat of a polyacetal resin, the diameter of the opened portion 21 is about 93% of the diameter of the ball portion thereof. Accordingly, the effect of the ball seat in resisting the separating load concerning the ball stud 13 is obtained reliably by suitable setting δ referred to above.

The above can be summarized as follows.

|  | Ball seat of a soft resin (polyurethane or polyester) | Ball seat of a hard resin (polyacetal) |
| --- | --- | --- |
| Ball stud separating load | 70 kg | 260 kg |
| Ball seat extruding load | 230 kg | 600 kg |

According to the present device, an annular recess is provided at the inner circumferential side of an annular flange formed at the closed side of a ball seat. Therefore, even when a ball seat molded out of a hard synthetic resin is used, the annular flange at the closed side thereof can be deformed elastically to the level equal to the inner diameter of the housing owing to this annular recess, and the ball seat can be combined with the housing without breaking the same annular flange. This enables the strength of the ball joint in terms of a ball stud separating load and a ball seat extruding load to be improved.

What is claimed is:

1. In a ball joint of the type that includes: a ball seat having an immovable closed side, an open inserting side, an outer wall portion and a ball stud having a ball portion mounted in said ball seat by insertion through said open side to provide a ball seat and ball stud subassembly; a housing having spaced apart opposite sides, a cylindrical bore passing therethrough from one of said sides to the other of said sides for receiving said outer wall portion and upper and lower opened edges on said housing sides, respectively, around said bore for holding said subassembly therein;

the improvement comprising:

said ball seat being formed out of a hard synthetic elastically deformable material;

said ball seat including an upper annular flange in spaced surrounding relation to said immovable closed side of said ball seat having a radially outward enlarged portion of a diameter that is, prior to insertion of said subassembly into said bore, greater than the inner diameter of said housing bore, said annular flange being engageable with said upper opened edge at said one side of said housing, and an inner circumferential side opposite said radially enlarged portion; and an annular recess adjacent said inner circumferential side of said upper annular flange and spaced radially inward in opposed relation to said radially outward enlarged portion to provide a space adjacent said immovable closed side into which said upper annular flange can move to thus permit said upper annular flange enlarged portion to be elastically deformed without deforming said closed side, to a diameter at least equal to the inner diameter of said housing bore upon insertion of said subassembly therein.

2. The ball joint according to claim 1, wherein said material comprises a thermoplastic hard polyacetal resin.

3. The ball joint according to claim 1, wherein said material comprises a thermoplastic hard polyamide resin.

4. The ball joint according to claim 1, wherein said material comprises a thermoplastic hard polyester resin.

5. A ball joint according to claim 1 wherein said ball seat outer wall portion has spaced apart upper and lower ends with said upper annular flange being adjacent said upper end, and a tapering part inclined radially outward to extend from said upper end of said outer wall portion adjacent said upper annular flange in radially outward spaced relation from said annular recess.

6. A ball joint according to claim 5 wherein said entire tapering part has a diameter that is slightly greater than said bore diameter of said housing and positioned radially outward of said annular recess so as to be deformable into said recess during assembly to eliminate clearance between said entire tapered portion and said housing bore when said ball seat is fitted into said bore.

7. A ball joint according to claim 1 wherein said ball seat includes a lower annular flange adjacent said open inserting side of said ball seat; said outer wall portion has upper and lower ends, said lower end being adjacent said lower annular flange; and a conical portion.

8. A ball joint according to claim 7 wherein said conical portion has a diameter slightly greater than said bore of said housing, said conical portion causing the diameter of said open end of said ball seat to decrease when said ball seat is fitted into said housing bore to increase the separating load required to pull said ball out of said ball seat.

9. A ball joint according to claim 1 wherein said ball seat comprises a unitary undivided member presenting an interior spherical seating cavity having an opening that is smaller in diameter than the diameter of said ball portion for receiving said ball portion therethrough; said upper annular flange and annular recess being diametrically opposite said opening; and a lower annular flange on said unitary member adjacent said open inserting side of said ball seat, said lower annular flange being in radially spaced surrounding relation to said opening.

* * * * *